UNITED STATES PATENT OFFICE.

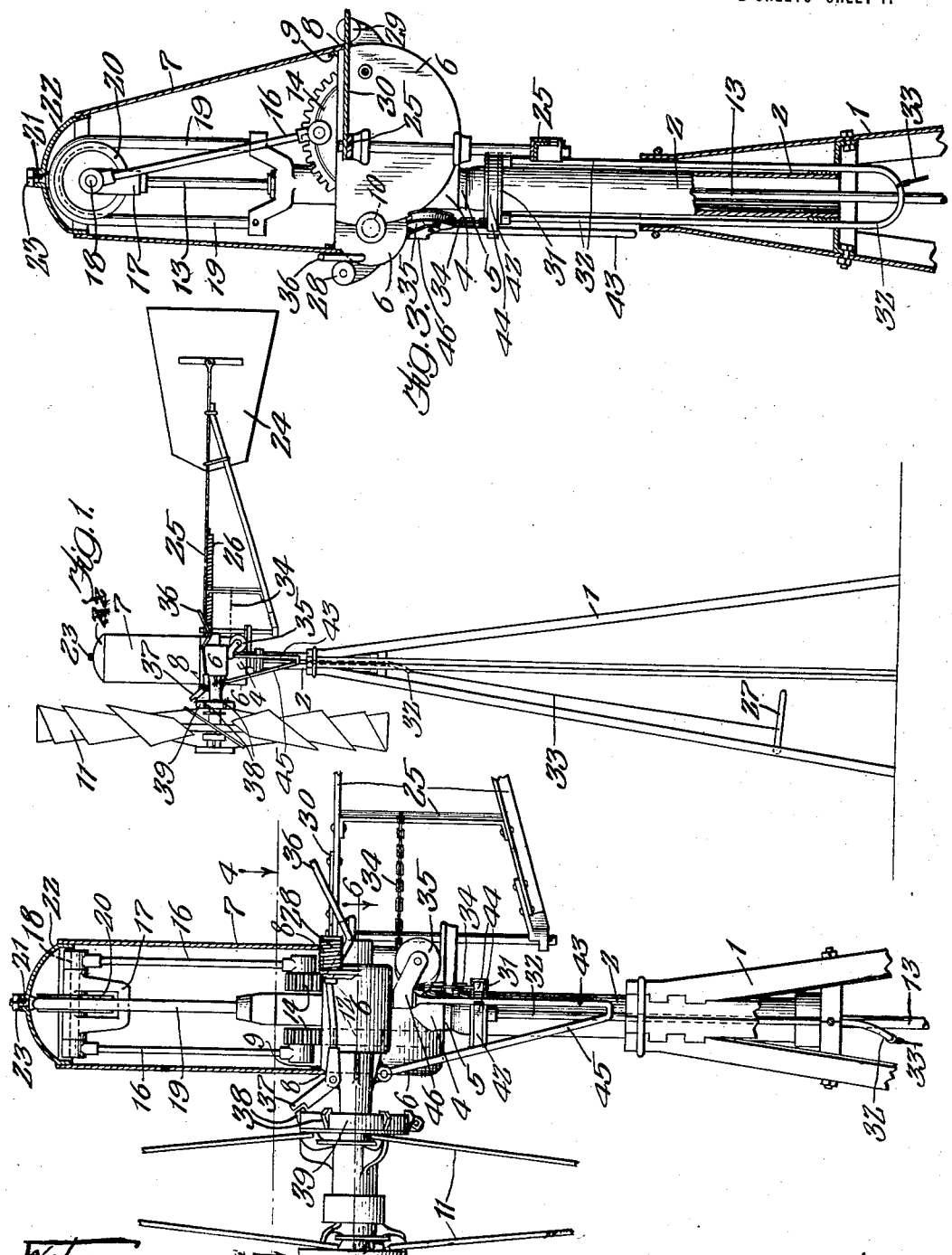

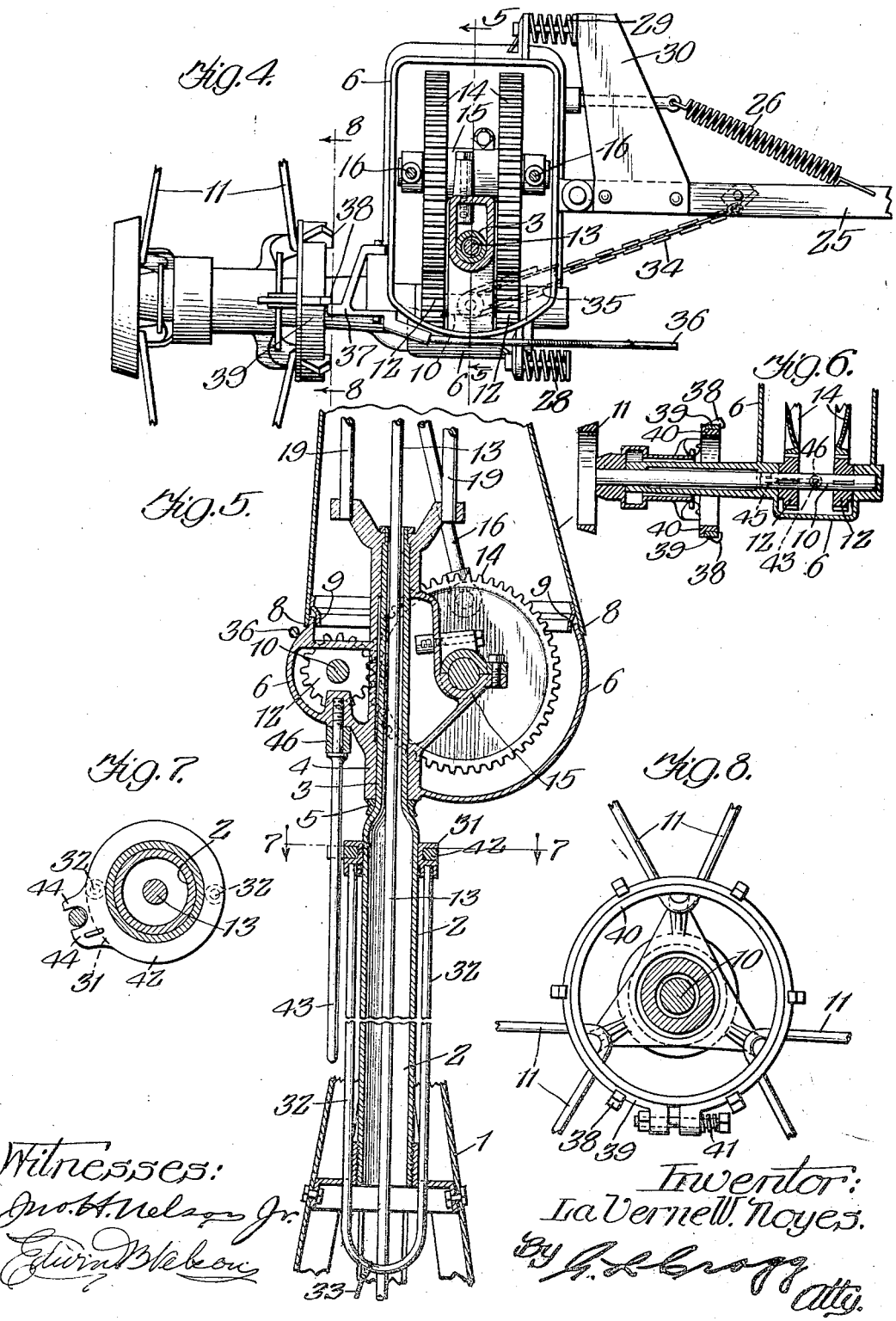

LA VERNE W. NOYES, OF CHICAGO, ILLINOIS, ASSIGNOR TO AERMOTOR COMPANY, OF CHICAGO, ILLINOIS, A CORPORATION OF ILLINOIS.

WINDMILL.

1,171,631.　　　　Specification of Letters Patent.　　Patented Feb. 15, 1916.

Application filed April 9, 1914.　Serial No. 830,627.

*To all whom it may concern:*

Be it known that I, LA VERNE W. NOYES, citizen of the United States, residing at Chicago, in the county of Cook and State of Illinois, have invented a certain new and useful Improvement in Windmills, of which the following is a full, clear, concise, and exact description, reference being had to the accompanying drawings, forming a part of this specification.

The invention relates to wind mills and has for its objects the simplification and improvement of wind mill mechanism and the reduction of friction between operating parts thereof.

A specific form of the invention, but to which form the invention is not to be limited, is shown by the accompanying drawings in which—

Figure 1 generally shows the structure; Fig. 2 shows the upper part more in detail, certain portions being removed and others appearing in section more clearly to reveal certain features; Fig. 3 is a side view of parts appearing in Fig. 2, certain portions being broken away and others appearing in section; Fig. 4 is a plan view on line 4 4 of Fig. 2; Fig. 5 is an elevation on line 5 5 of Fig. 4; Fig. 6 is a plan view on line 6 6 of Fig. 2; Fig. 7 is a sectional view on line 7 7 of Fig. 5; and Fig. 8 is a sectional view on line 8 8 of Fig. 4.

Like parts are indicated by similar characters of reference throughout the different figures.

The top of tower 1 terminates in an upright stationary tubular column 2 whose reduced upper end constitutes an upright shaft 3 affording an upright axis about which the wind mill head 4 may turn upon a step bearing ring 5 supported upon the lower column portion. The head 4 is enlarged into an oil chamber 6 that may contain lubricant for the gearing. A chamber closing hood 7 has sheds 8 and 9 between which the chamber rim is received and which respectively prevent entrance of water and the exit of oil at said rim. The shaft 10 of wind wheel 11 is journaled in enlargements of walls of the chamber 6, and carries two upright pinions 12 for driving the upright pump or load rod 13. Upright transmission gears 14 are in mesh with pinions 12 and are journaled within a bearing 15 carried by the head 4. Pitmen 16 connect gears 14 with the upper end of load rod 13. A stirrup 17 is fixed upon the upper end of the load rod and carries bearings in which a shaft 18 turns. The outer ends of this shaft are in fixed connection with the upper ends of the pitmen 16 whereby the pitmen are maintained in proper inter-relation without relying upon a guide structure to perfom this function. The gears and pitmen are equidistant from a plane parallel to the gears and which plane includes the axis of the load shaft, whereby the driving force upon the load rod is evenly distributed. The head 4 carries an upright stirrup 19 whose parallel branches constitute upright guides that are simultaneously received in the groove of an anti-friction wheel or roller 20 that turns on and with respect to the shaft 18. Said roller is permitted very slight bodily movement in the plane of the stirrup 19 so that it may have rolling engagement with but one vertical branch of the stirrup 19 at a time. The friction which is thus reduced may be still further reduced if the vertical guides do not have to take part in maintaining the pitmen in proper inter-relation, a function which is avoided if the shaft 18 is in rigid relation to the pitmen, as hitherto described. The threaded stem termination 21 of stirrup 19 passes through the top plate 22 of hood 7 whereby a nut 23 may clamp the hood in place.

The mill vane 24 has a stem 25 mounted upon the head 4 to swing about an upright axis. A coil spring 26 connects the mill vane with the head 4 and, as shown, operates to maintain the vane open and the wheel 11 in the wind. A lever 27 (Fig. 1) may be operated against the force of spring 26 to close the vane toward the wind wheel to bring this wheel out of the wind. Buffer springs 28 and 29 cushion the vane when moved to closed and open positions respectively, a wing 30 upon the vane stem 25 engaging one or the other of these springs.

The larger portion of the stationary column 2 is encircled by a coupler or cross head 31 to which is attached a non-rotating stirrup or other extension 32 that is connected with the upper end of a wire 33 whose lower end is connected with lever 27. A chain or other suitable form of flexible tie member 34 is connected at its lower end with the coupler and at its upper end with the vane stem 25. When the lever 27 is depressed the stirrup 32 and coupler 31 are drawn downwardly to cause the chain 34 to pull the mill vane to a closed position. As the mill vane reaches its closed position it engages the intermediately pivoted lever 36 mounted upon the mill head, the nose end 37 of the lever finally being placed between some adjacent lugs 38 carried by a brake band 39 to apply the brake to check the idle rotation of the wind wheel when out of the wind. If the nose 37 should initially engage the top of a lug, the opposite and resilient end of lever 36 will permit the mill vane to assume its closed position, the resilience of the lever forcing the nose 37 between adjacent lugs when the wind wheel is turned further. The brake band surrounds a brake drum 40 that is always in driven relation to the wind wheel. A spring 41 is adjusted to determine the braking force that is limited to the interaction of the brake elements 39 and 40, and is not dependable upon extraneous factors. When the wheel 11 is in the wind the brake structure is ineffective as such, since there is nothing then to prevent the two brake elements 39 and 40 from turning together and without braking interaction. When the wheel 11 is brought out of the wind, however, the lever nose 37 brings the brake elements from their non-coöperative relation into coöperative braking relation by engaging a lug 38 to check the idle rotation of the wind wheel without the aid of any braking action extraneous to that afforded by the brake drum fixed to the wheel and the brake band that is then held from rotating with the wheel. A definite braking effect may thus be predetermined within the brake structure itself and the structure may readily be and is preferably so designed that the braking action will not occur until the wind wheel is definitely out of the wind.

To enable the chain or tie 34 to move bodily with the mill head the lower end of said tie is connected with a ring 42 forming a rotatable part of the coupler. The ring 42 is caused to accompany head 4 in its bodily movement by means of a long finger extension 43 which is secured at its upper end to the head 4 and is in permanent sliding engagement with and between projections 44 formed upon the ring irrespective of the vertical position of the ring. A brace 45 connects the lower end of the finger with another portion of the head 4 (Fig. 2).

The upright sheave 35 is mounted bodily to swing about an upright axis, to which end its supporting bracket 46 is journaled upon the upper end of finger 43. The bracket thus has an axis of rotation which is non-coincident with the axis of the mill head. By this construction not only does the tie 34 accompany the wind mill head in its movements but the sheave 35 will shift its plane to maintain it coincident with the plane of the tie chain as the mill vane moves between its open and closed positions. Features herein shown but not claimed are claimed in my divisional application Serial No. 865,451, filed October 7, 1914.

While there is herein shown and particularly described the preferred embodiment of the invention, the invention is not to be limited to the precise details of construction shown as changes may readily be made without departing from the spirit of the invention, but

Having thus described the invention there is claimed as new the following:—

A wind mill including a wind wheel; a supporting head for said wheel; means for placing the wheel in and out of the wind; an upright column upon which said head is mounted to turn about an upright axis; a coupler movable along the column and provided with means to enable it to be moved up and down; an upright sheave; a bracket upon which the sheave is mounted to rotate and itself mounted upon the mill head to be movable about an upright axis; and a tie member connecting said coupler with said means.

In witness whereof, I hereunto subscribe my name this twenty-fourth day of March, A. D. 1914.

LA VERNE W. NOYES.

Witnesses:
 ETTA L. WHITE,
 GEORGE L. CRAGG.